Oct. 22, 1946.  H. F. DOBSCHA  2,409,741
SETTLING BASIN FOR BLAST FURNACE CINDER RUNNERS
Filed July 19, 1945  2 Sheets-Sheet 1

INVENTOR
Herman F. Dobscha
BY John E. Jackson
ATTORNEY

Oct. 22, 1946.    H. F. DOBSCHA    2,409,741
SETTLING BASIN FOR BLAST FURNACE CINDER RUNNERS
Filed July 19, 1945    2 Sheets-Sheet 2

INVENTOR
Herman F. Dobscha
BY John E. Jackson
ATTORNEY

Patented Oct. 22, 1946

2,409,741

UNITED STATES PATENT OFFICE 2,409,741

SETTLING BASIN FOR BLAST FURNACE CINDER RUNNERS

Herman F. Dobscha, Pittsburgh, Pa., assignor to Carnegie-Illinois Steel Corporation, a corporation of New Jersey Application July 19, 1945, Serial No. 606,011

11 Claims. (Cl. 266—38)

This invention relates to a settling basin for the cinder runner of a blast furnace.

The invention has among its objects the provision of a settling basin for the cinder runner of a blast furnace, the settling basin being of such design that a predominant amount of the iron normally entrained in the molten slag or cinder from the furnace may be recovered directly by reason of its separation from the cinder in the basin.

This and other objects of the invention will be more fully apparent in the following description.

When slag or cinder is run off from a blast furnace, particularly that slag which has very recently been in intimate agitated contact with the molten iron, as, for instance, that skimmed off the iron in the iron runner, it is found to contain mixed or entrained in it an appreciable amount of molten iron. The amount of iron so entrained in the slag and carried with it into the cinder pots is appreciable, reaching values as high as four to five per cent of the total weight of slag tapped from the furnace when the more viscous slags are employed. In order to recover such iron, at least in part, it has been the practice in the past, in the operation of some blast furnaces, to recover the iron at the slag dump, in the form of "buttons," into which it has settled and solidified at the bottom of the cinder pots. Although such recovery is economically feasible, it entails much disagreeable labor and the added cost of transporting such buttons back to the plant and the remelting of them as, for instance, in the open hearth furnace.

The use of the present invention eliminates the necessity for such mode of recovery of the iron entrained in the cinder. The settling basin of the present invention, which may be interposed in any of the cinder runners of the blast furnace where there is the possibility of the presence of a material amount of iron in the cinder run therethrough, shows perhaps its greatest advantages when placed in the cinder runner leading to the skimmer in the iron runner. The basin is of such volume relative to the area and speed of flow of the cinder-iron mixture thereinto that it provides sufficient time for substantially all the iron to settle from the mixture. In addition, the inlet and outlet runners of the basin are offset or are given such different directions with respect to each other that the mixture flowing into the basin impinges upon a wall thereof in such manner that the mixture is caused to flow generally circumferentially of the basin, thereby further aiding in the separation of the iron from the cinder.

The invention will be more readily understood by reference to the accompanying drawings, in which.

Figure 1:
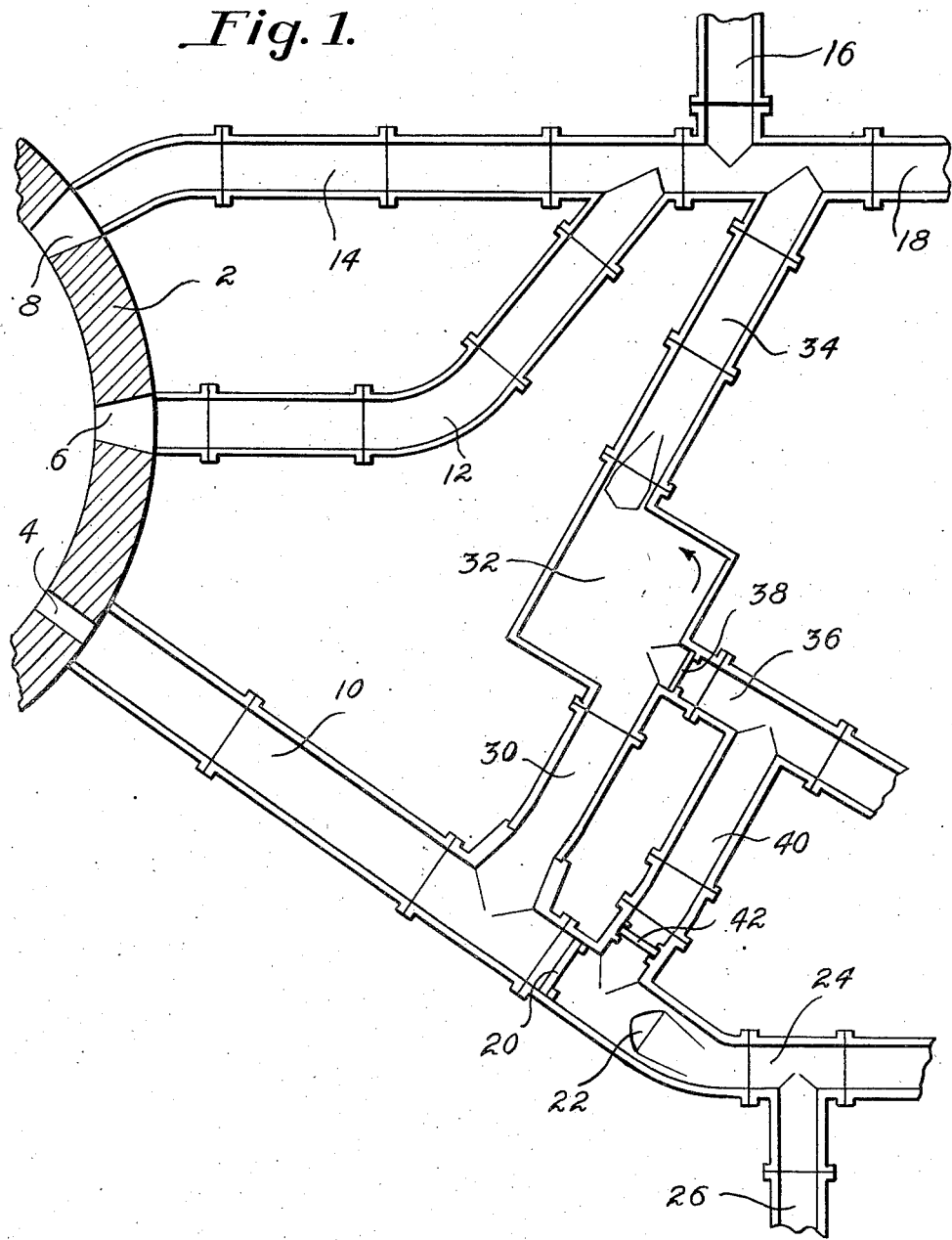
Figure 1 is a view in plan of a portion of a typical cinder and iron runner system adjacent the blast furnace, the settling basin of the present invention being shown interposed in the cinder runner from the iron skimmer.

In Figure 1 there is shown that portion of the cinder and iron runner system adjacent the blast furnace in a typical blast furnace installation. Blast furnace 2, of which a portion is shown, is provided with an iron notch 4 through which is tapped the molten iron, a first cinder notch 6 at a level somewhat above the iron notch, and a second cinder notch 8 somewhat above the first cinder notch. Molten iron tapped from notch 4 flows downwardly therefrom through the iron runner 10, whereas the cinder tapped from the two cinder notches 6 and 8 flows through cinder runners 12 and 14, respectively, the ends of which merge, as shown in Figure 1, into a common cinder runner 18 to which various branch runners such as 16 are connected to carry the molten cinder into cinder pots.

The iron runner 10 is provided with a skimmer 20 which may be of various known types, of which that known as the Killeen skimmer or skimmer trough shown in Patent No. 608,143 is typical. The skimmer, which is provided with a trough deeper than the bottom of the runner, and with a partially raised gate to restrain the passage of cinder down the iron runner, is provided with a dam 22 over which the molten iron flows, the molten iron then running into the outer iron runner system consisting of the iron runner main 24 and various branches such as 26, which lead to the iron ladles.

Connected to the iron runner 10 at a point adjacent the skimmer and between it and the blast furnace is a cinder runner 30 which carries away the cinder removed from the molten iron in runner 10 by the skimmer 20. Such cinder usually contains by far a greater amount of entrained iron than does that in either of runners 12 and 14, and it is for this reason, that there is connected to the runner 30 the settling basin 32, made in accordance with the present invention.

Figure 2:
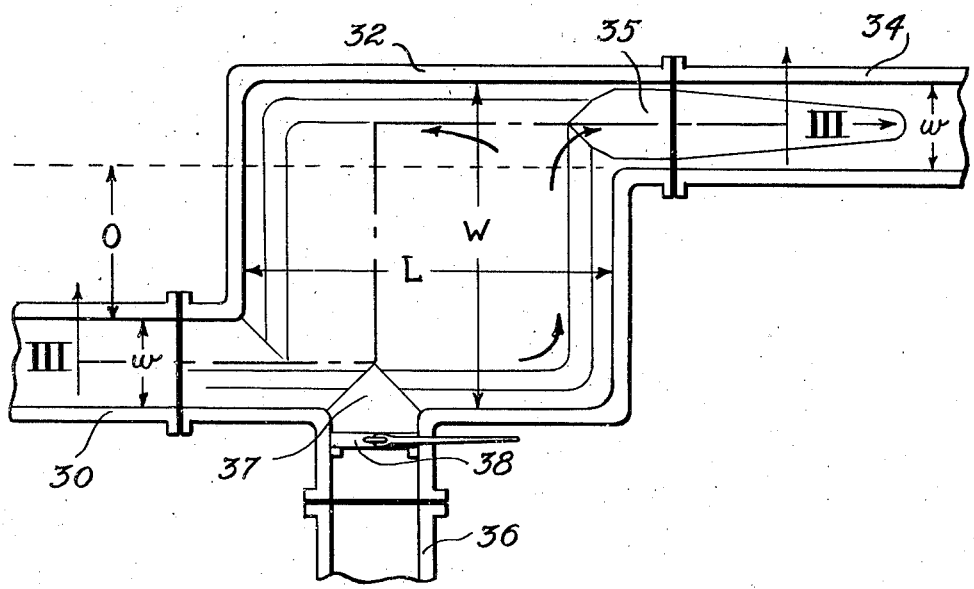
Figure 2 is an enlarged view in plan of the settling basin shown in Figure 1.
Figure 3:
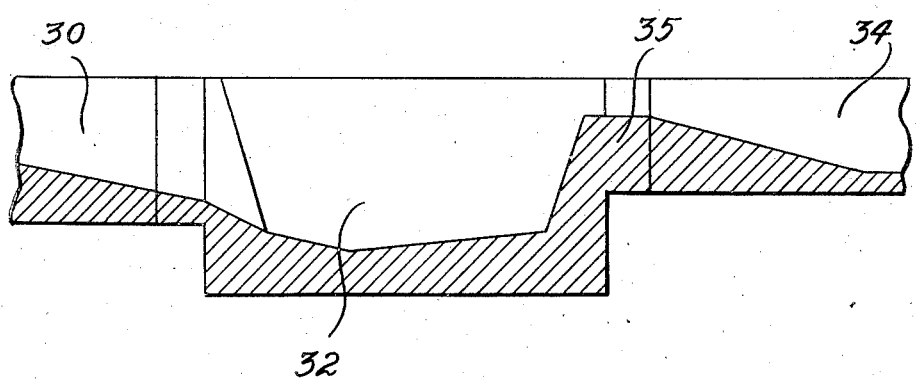
Figure 3 is a view in cross section through the settling basin, the section being taken along the line III—III in Figure 2.

Runner 30, which is parallel to the length of the basin, connects to such basin, as shown, at the side of one end wall thereof, and the outlet cinder runner 34 from the basin connects to the opposite end wall, at a point diagonally opposite the point of connection of runner 30. In the modification shown runner 34 is parallel to runner 30. As a result of the above conditions, the cinder flowing into the basin from runner 30 is prevented from flowing directly through the basin into outlet runner 34. Instead, it impinges upon the wall to which the outlet runner is connected, and at least part of it, as shown in Figure 2, flows around the basin in a direction opposite to the direction of flow out runner 34. Outlet runner 34 is provided with a dam 35, more plainly shown in Figures 2 and 3, which prevents the flow of molten cinder out of the basin until the basin is substantially full. Consequently the mixture of iron and cinder is held in the basin for an appreciable time, whereby a predominant amount of the iron entrained in the cinder settles to the bottom of the basin where it forms a pool of molten iron. At the end of the cast such pool of iron is drawn off through the runner 36 by the raising of the normally closed gate 38, runner 36 being appreciably lower than the bottom of the basin and being connected thereto by the downwardly sloping surface 37.

The cinder flowing through outlet runner 34 flows into the cinder main runner 18, as shown in Figure 1, and thence through one of the branch runners into a cinder pot. The iron recovered from such cinder in the settling basin and drawn off through runner 36 is led to an iron runner and thence to a ladle. In the installation shown in Figure 1 runner 36 is connected to iron runner 40, by which the molten iron remaining in the bottom of the skimmer trough is drained at the end of the cast by the raising of gate 42. Thus the recovery of iron from the cinder by the settling basin enables such iron to be returned immediately in molten condition to the iron ladle. In addition, operation of such basin entails little, if any, added labor, since it is self-operating but for the raising of the gate 38 to drain the molten iron therefrom. Use of the settling basin of the present invention has resulted in a decrease in the amount of iron carried by the cinder into the cinder pots from the previous 4 to 5% to approximately 0.8% of the slag tapped from the furnace.

In the particular embodiment illustrated, the settling basin, which may be made of cast iron, has a length L at the top thereof of approximately eight feet, and a width W, likewise taken at the top, of approximately seven feet. In the installation shown, the basin has a depth of approximately four feet. It will be observed from the contour lines of Figure 2 that the side walls of the basin slope gradually inwardly, and that the corners are rounded in order to avoid the formation of any sharp corners, thus aiding the swirling flow of cinder within, and to facilitate cleaning of the basin. The inlet and outlet runners 30 and 34 respectively, in the preferred embodiment, have the same width $w$ at their tops, which in this case is approximately two feet, four inches. To cause the incoming mixture of cinder and iron to impinge upon a wall of the basin, the adjacent inner walls of the inlet and outlet runners are offset for an appreciable distance O. In this modification the offset O is made approximately three feet, four inches.

It is obvious that the various dimensions given above, such as width and length of the settling tank, its depth, the width of the runners, and the amount of offset, may be materially varied within the scope of the invention. The main considerations are that the basin have sufficient volume relative to the volume of flow of cinder into it so that the velocity of flow through the basin is greatly lower than that through the inlet runner, that the cinder is prevented from flowing directly in a straight line through the basin from the inlet to the outlet runner, and that preferably it impinges upon a wall of the basin opposite the wall through which it enters, so that the cinder in the basin is given a swirling movement which still further aids separation of the iron from the cinder by reason of the difference in specific gravities of the iron and cinder. Such objects are accomplished when the inner adjacent walls of the inlet and outlet runners are substantially offset, as shown. In the preferred embodiment, with runners 30 and 34 substantially parallel to each other at their points of connection to the basin, the amount of offset is such that the areas of flow of cinder into and out of the basin through such runners, respectively, projected within the basin, are spaced from each other at all points. It will be appreciated, however, that although the inlet and outlet runners are shown parallel, substantially the same results may be accomplished, provided the other conditions above are observed, when such runners are at an appreciable angle to each other.

Having thus fully disclosed the settling basin for a cinder runner of a blast furnace of the present invention and the manner in which it operates, I desire to claim as new the following.

I claim:

1. In the combination of a blast furnace having a cinder runner, the improvement which comprises a settling basin connected at one end thereof to the cinder runner, said settling basin having a width substantially greater than the width of the cinder runner feeding the basin, a second cinder delivery runner connected to the opposite end of the settling basin from the first cinder runner, said second cinder runner being of a width substantially less than that of the settling basin, the first and second cinder runners at their points of connections to the settling basin being substantially parallel and offset relative to each other a substantial distance so that the areas of flow of cinder into and out of the settling basin projected within the basin are spaced from each other at all points.

2. In the combination of a blast furnace having a cinder runner, the improvement which comprises a settling basin connected at one end thereof to the cinder runner, said settling basin having a width substantially greater than the width of the cinder runner feeding the basin, a second cinder delivery runner connected to the opposite end of the settling basin from the first cinder runner, said second cinder runner being of a width substantially less than that of the settling basin, the first and second cinder runners at their points of connection to the settling basin being substantially parallel and having the inner side of one and the adjacent inner side of the other spaced from each other laterally of the basin at least a distance at least substantially equal to the width of the first cinder runner, so that the areas of flow of cinder into and out of the settling basin projected within the basin are spaced from each other at all points.

3. In the combination of a blast furnace having a cinder runner, the improvement which comprises a settling basin of generally rectangular horizontal section connected at one end thereof to the cinder runner, said settling basin having a width substantially greater than the width of the cinder runner feeding the basin, a second cinder delivery runner connected to the opposite end of the settling basin from the first cinder runner, said second cinder runner being of a width substantially less than that of the settling basin, the first and second cinder runners at their points of connection to the settling basin being substantially parallel and having the inner side of one and the adjacent inner side of the other spaced from each other laterally of the basin at least a distance at least substantially equal to the width of the first cinder runner, so that the areas of flow of cinder into and out of the settling basin projected within the basin are spaced from each other at all points.

4. In the combination of a blast furnace having an iron notch, an iron runner associated therewith, a skimmer trough in the iron runner, and a cinder runner leading from the skimmer trough, the improvement which comprises a settling basin connected at one end thereof to the cinder runner, said settling basin having a sufficient horizontal area and volume to allow the molten cinder to flow therethrough at substantially lower speeds than through the cinder feeding runner, a second cinder delivery runner connected to another wall of the settling basin from the first cinder runner, said second cinder runner being of a width substantially less than that of the settling basin, the first and second cinder runners at their points of connection to the settling basin having such location and direction relative to each other that the stream of molten cinder flowing into the basin from the first runner in the main impinges upon a wall of the basin before flowing out the second runner.

5. In the combination of a blast furnace having an iron notch, an iron runner associated therewith, a skimmer trough in the iron runner, and a cinder runner leading from the skimmer trough, the improvement which comprises a settling basin connected at one end thereof to the cinder runner, said settling basin having a width substantially greater than the width of the cinder runner feeding the basin, a second cinder delivery runner connected to the opposite end of the settling basin from the first cinder runner, said second cinder runner being of a width substantially less than that of the settling basin, the first and second cinder runners at their points of connections to the settling basin being substantially parallel and offset relative to each other a substantial distance so that the areas of flow of cinder into and out of the settling basin projected within the basin are spaced from each other at all points.

6. In the combination of a blast furnace having an iron notch, an iron runner associated therewith, a skimmer trough in the iron runner, and a cinder runner leading from the skimmer trough, the improvement which comprises a settling basin connected at one end thereof to the cinder runner, said settling basin having a width substantially greater than the width of the cinder runner feeding the basin, a second cinder delivery runner connected to the opposite end of the settling basin from the first cinder runner, said second cinder runner being of a width substantially less than that of the settling basin, the first and second cinder runners at their points of connection to the settling basin being substantially parallel and having the inner side of one and the adjacent inner side of the other spaced from each other laterally of the basin at least a distance at least substantially equal to the width of the first cinder runner, so that the areas of flow of cinder into and out of the settling basin projected within the basin are spaced from each other at all points.

7. In the combination of a blast furnace having an iron notch, an iron runner associated therewith, a skimmer trough in the iron runner, and a cinder runner leading from the skimmer trough, the improvement which comprises a settling basin of generally rectangular horizontal section connected at one end thereof to the cinder runner, said settling basin having a width substantially greater than the width of the cinder runner feeding the basin, a second cinder delivery runner connected to the opposite end of the settling basin from the first cinder runner, said second cinder runner being of a width substantially less than that of the settling basin, the first and second cinder runners at their points of connection to the settling basin being substantially parallel and having the inner side of one and the adjacent inner side of the other spaced from each other laterally of the basin at least a distance at least substantially equal to the width of the first cinder runner, so that the areas of flow of cinder into and out of the settling basin projected within the basin are spaced from each other at all points.

8. In the combination of a blast furnace having a first cinder runner, the improvement which comprises a settling basin connected at one end thereof to and fed by the first cinder runner, a second, cinder delivery, runner for feeding cinder out of the basin connected to a different wall of the settling basin from that to which the first cinder runner is connected, the first and second cinder runners at their points of connection to the settling basin having such location and direction relative to each other, that the paths of flow of molten cinder into and out of the settling basin are appreciably out of alignment with each other, and that the stream of molten cinder flowing into the basin from the first runner in the main impinges upon a wall of the basin, before flowing out of the second runner.

9. In the combination of a blast furnace having a first cinder runner, the improvement which comprises a settling basin connected at one end thereof to and fed by the first cinder runner, said settling basin having a sufficient horizontal area and volume to allow the molten cinder to flow therethrough at substantially lower speeds than through the cinder feeding runners, a second, cinder delivery, runner for feeding cinder out of the basin connected to the settling basin, said second cinder runner being of a width substantially less than that of the settling basin, the first and second cinder runners at their points of connection to the settling basin having such location and direction relative to each other, that the paths of flow of molten cinder into and out of the settling basin are appreciably out of alignment with each other, and that the stream of molten cinder flowing into the basin from the first runner in the main, impinges upon a wall of the basin before flowing out of the second runner.

10. In the combination of a blast furnace having an iron notch, an iron runner associated therewith, a skimmer trough in the iron runner and a first cinder runner leading from the skimmer trough, the improvement which comprises a settling basin connected at one end thereof to and fed by the first cinder runner, a second, cinder delivery, runner for feeding cinder out of the basin connected to a different wall of the settling basin from that to which the first cinder runner is connected, the first and second cinder runners at their points of connection to the settling basin having such location and direction relative to each other, that the paths of flow of molten cinder into and out of the settling basin are appreciably out of alignment with each other, and that the stream of molten cinder flowing into the basin from the first runner in the main, impinges upon a wall of the basin before flowing out the second runner.

11. In the combination of a blast furnace having an iron notch, an iron runner associated therewith, a skimmer trough in the iron runner and a first cinder runner leading from the skimmer trough, the improvement which comprises a settling basin connected at one end thereof to and fed by the cinder runner, said settling basin having a sufficient horizontal area and volume to allow the molten cinder to flow therethrough at substantially lower speeds than through the cinder feeding runner, a second, cinder delivery, runner for feeding cinder out of the basin connected to the settling basin, said second cinder runner being of a width substantially less than that of the settling basin, the first and second cinder runners at their points of connection to the settling basin, having such location and direction relative to each other that the paths of flow of molten cinder into and out of the settling basin are appreciably out of alignment with each other, and that the stream of molten cinder flowing into the basin from the first runner in the main, impinges upon a wall of the basin before flowing out the second runner.

HERMAN F. DOBSCHA.